UNITED STATES PATENT OFFICE.

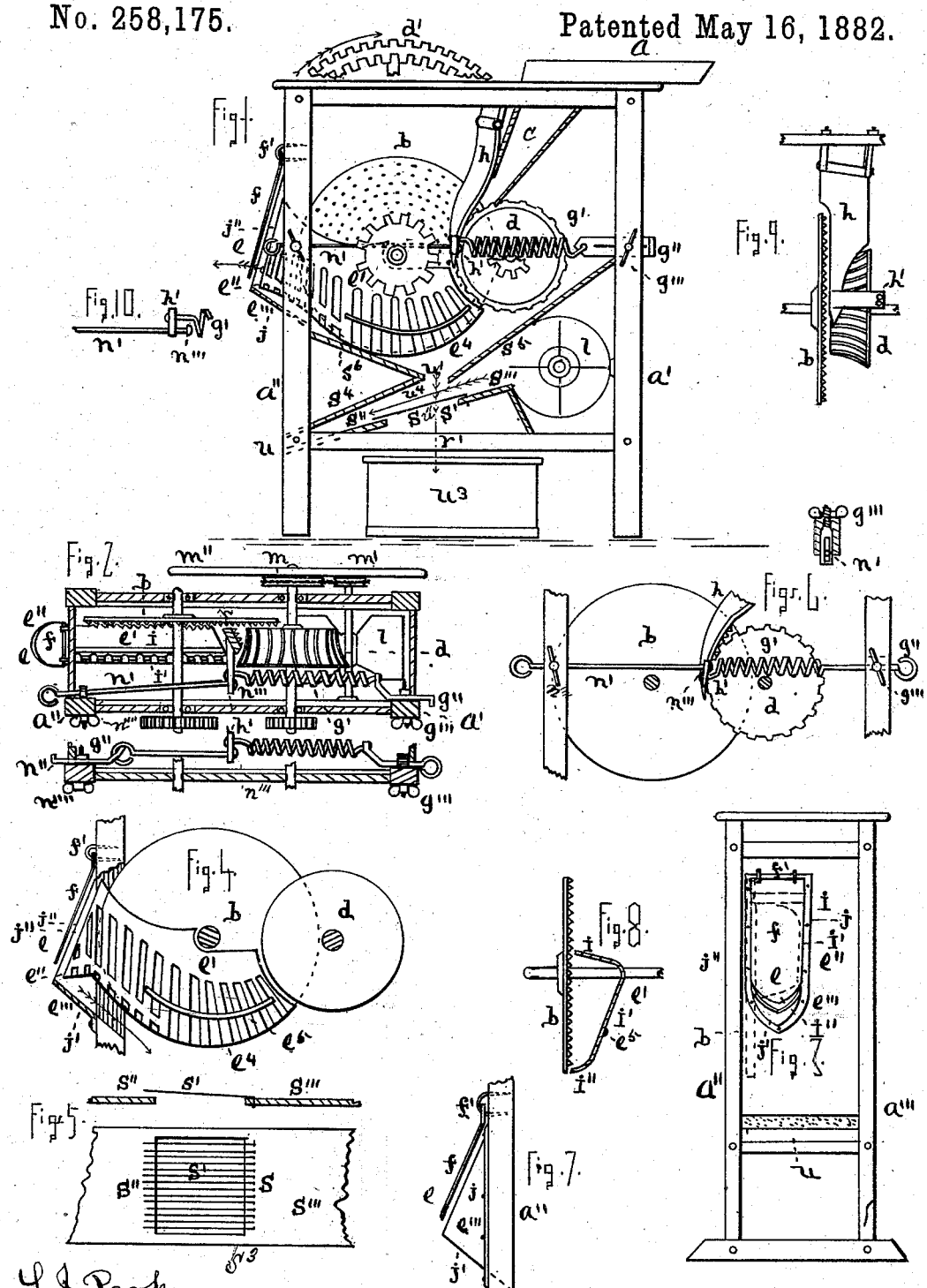

JOHN SAYLES WATERMAN, OF ITHACA, NEW YORK.

CORN-SHELLER.

SPECIFICATION forming part of Letters Patent No. 258,175, dated May 16, 1882.

Application filed October 20, 1881. (No model.)

*To all whom it may concern:*

Be it known that I, JOHN SAYLES WATERMAN, of Ithaca, Tompkins county, New York, have invented an Improved Corn-Sheller, of which the following is a specification, reference being had to the accompanying drawings.

My object is to improve certain parts of the corn-sheller already covered in part by patents granted to me; and the especial subjects to which my improvements have been directed are the spring which bears on the pressure-bar which holds the ear of corn against the shelling-wheel, and the cob-conveyer, and the sieve that separates the silk, small pieces of cob, &c., from the corn; and the nature of my invention will be apparent as I describe it.

Figure 1 is a side elevation of my machine; Fig. 2, a transverse section and plot; Fig. 3, an elevation of the left-hand end of the machine. Fig. 4 is a detached view of the cast-iron cob-conveyer, the cob-exit being shown in section. Fig. 5 shows my improved sieve and the detached ends of the wires of which it is composed. Fig. 6 is a detached view of the pressure-bar spring and its rods and clamps. Fig. 7 is a side view or elevation of the cob-exit closed by its metallic apron. Fig. 8 is a detached section of the cob-conveyer, showing its shape and relations to the rag-wheel. Fig. 9 is a detached view, (seen from the left-hand end of my machine,) showing the pressure-bar, shelling-wheel, rag-wheel, and that the extension or arm of the pressure-bar is made for applying the force of the spring to the point of the bar and to clear the shelling-wheel. Fig. 10 is a detached view of the end of that bar, with the relations of the pressure-bar, spring, and checking-rod. The small figure of Fig. 6 shows the method of clamping the rods themselves without the use of the slotted plates shown elsewhere.

In the figures the letters correspond in part with those of my patent of October 26, 1880, to which reference is made for certain parts; and $a$ is the hopper on the frame $a'$ $a''$, whence there is a spout, $c$, that leads to the rag-wheel $b$ that rotates the ear of corn against the shelling-wheel $d$, which wheels are driven by a double cog-wheel, $d'$, which meshes into the cogs on the shafts of the wheels $b$ and $d$; and $h$ is the pressure-bar.

In a patent granted to H. W. Cornell on the 18th day of June, 1872, in which I am interested, there is shown an arm extending from near the pressure-bar hinge, to which there is attached a spiral spring. This has advantages and disadvantages.

By my present improvement it will be seen that I attach to the lower end of the bar $h$ an extension, $h'$, sufficiently long and for the purpose of clearing the shelling-wheel $d$, to which I attach a spiral spring, $g'$, one end of which I secure to the extension $h'$ and the other to the adjustable slide $g''$, which slide is slotted for the set-screw $g'''$, which regulates the force of the spring. A check or stop rod, $n'$, goes from the frame-post $a''$ to the pressure-bar extension $h'$, through which it passes loosely to its head $n'''$. Its use is to prevent the spring from drawing the pressure-bar against the wheel $d$. It has a slotted slide, $n''$, and set-screw, $n''''$, on its left-hand end to regulate the point of stoppage. By this arrangement the hand of the operator regulates the spring and its stop outside of the machine at convenient places, and the spring acts directly on the pressure-bar at the place where the greatest labor is done.

It will be noticed that the cob-conveyer is three-sided and applied to the side of the rag-wheel $b$, and similar in its shape to that in my patent of October 26, 1880; but the openings described in this specification are made by transverse bars instead of the longitudinal ones of that patent, and I now make the cob-conveyer to extend out of the machine into the lip $e'''$ several inches, thus making an extension, $e''$, with the same transverse bars $c^4$. The preferable form of the bars and of the openings between them is seen in Fig. 4. One or more cross-bars, $e^5$, support the lower parts of the transverse bars. The use of the transverse bars and openings is to separate the kernels of corn as the rag-wheel $b$ moves the cobs out of the exit $e$.

There is a lip or cup represented as made of wood in the patent granted to me on the 22d day of February, 1881, with a slitted apron that reaches nearly to the lip or cup.

In the present drawings there are shown a metallic lip or cup and a metallic apron, $f$, that closes the orifice $e$, and, except at its lower part, the edge of the cup also, there being a space left which aids the escape of the cobs. This apron is hinged at its top, and hangs down obliquely, and is opened by the cob, and is for the same purpose as my flexible many-tailed apron of the patent just named, to prevent the escape of stray kernels of corn, which is quite an annoyance in a fast-shelling corn-sheller.

The machine is propelled by a crank or belt wheel connected with the double cog-wheel $d$, and wheels $m$ $m'$, having a belt, propel the fan; and $m''$ is the fly-wheel. The pressure-bar $h$ is seen in section in Fig. 2 in the shelling-wheel angle between the wheels $b$ and $d$, and in that figure the action of the spring $g'$ and stop-rod $n'$ is apparent, being connected with the pressure-bar extension $h'$. The rod $n'$, with head, is loose in the extension $h'$, as seen by the detached figures. In Fig. 6 the parts already named are seen detached, concerning the transverse line for the spring across the machine just above the shafts of the wheels $b$ and $d$. In Fig. 1 the set-screw slide is represented to be flat, slotted, and longitudinal to the spring and its rods. In Fig. 6 there is shown a clamp on the rods themselves. In Fig. 3 will readily be seen the dotted line $a''$, which is the transverse section of the cob-conveyer, the left-hand dotted perpendicular lines indicating the side of the rag-wheel next to the conveyer. To make this clearer, in the detached figure, 8, will be seen an elevation of the wheel $b$, with a portion of the shaft of that wheel and a section of the cob-conveyer just to the left of the shaft, which is the general transverse shape of all parts of the conveyer. Its roof $i$ is about the width of the wheel $d$. It curves downward abruptly to the side $i'$, which contracts to the floor $i''$, which almost touches the wheel $b$. It is a cob-conveyer and corn-separator, and may have one, two, or more sets of openings arranged one above the other; but the perpendicular bars and openings are used to make them, which are transverse to the length of the conveyer, and are shown in Figs. 1 and 4, where they radiate from the shaft of the wheel $b$, near the wheel $d$, and gradually become perpendicular, which position they preserve until they end in the lip $e'''$, as shown. The roof and floor of the conveyer fit the wheel $b$ by digitations, and the conveyer also fits by a curve the wheel $d$ and goes beneath that wheel. The roof reaches from the orifice $e$ at the left hand to near the shaft of the wheel $b$, beneath which it curves, and terminates near the wheel $d$, there being a space left or cut out for the pressure-bar to operate in, as shown.

The metallic cup or lip $e'''$ is shown in various figures—sidewise in Figs. 1, 4, and 7, and from above in Fig. 2, and its apron not quite closing the aperture $e$ at its lower part. It is an improvement on my patent of February 22, 1881, and is a "funnel-shaped aperture" of that patent; but its sides as improved extend to the top of the aperture, with sides $j j''$ and base or floor $j'$ extending outward and fitted for the apron $f$, and inclosing a space, (which is the aperture $e$,) except at its top; and its object is to catch any corn that the apron $f$ or extension $e''$ may return to the central parts of the machine, while the object of the extension into the cup, lip, or funnel is to give a further space for the separation of the corn removed from the intense action of the rapid shelling done in the angle between the wheels $b$ and $d$ and the bar $h$, as well as the tendency of the teeth of the wheel $b$ to throw corn out of the exit—a matter that requires much attention.

The apron $f$ is apparent in form and function, (seen in the figures named,) and is also an improvement on the patent just named, and is hinged by staples $f'$ at its upper part, and has an angle just below, whence, fitting the lip $e'''$, it extends downward, and is fitted to cover the mouth of the cup, as described, and allows the cobs to escape, but retains the corn.

The sieve $s$ is a part of the separating attachment of my machine, and is arranged in the space beneath the shelling apparatus and above the receptacle $u^3$, or the space for a receptacle. It consists of the corn-collecting boards $s^5$ and $s^6$, which board $s^6$ is a continuation of the lip $e'''$ and of the fan $l$, inclosed by sheet-iron on its sides, and of a base-board, $s^3$, with two ends, the lower, $s''$, and upper, $s'''$. The wires of the sieve are secured to the end $s'''$ by one of their ends, and their other ends are detached and raised or elevated a little above the end $s''$ of the board $s^3$, as well as projecting a short distance downward and over the end $s''$, and are without cross-wires, side by side, longitudinally to the board, and thus made with especial reference to the silk that accompanies the corn.

The sides of the machine are the sides of the blast-tube and of the collecting cavity or hopper. Arrows indicate the directions of corn and blast. In the bottom of the collecting-hopper is the aperture $w'$, that feeds the corn through the blast-tube to the lower aperture, $u''$, in the sieve-board $s^3$, over which aperture $u''$ is the sieve $s$, as has been said. Through the upper aperture passes the corn, with its impurities, toward the sieve, the chaff being blown out of the exit $u$, and the silk, pieces of cob, or like substances falling on the wires $s'$ are blown off of the detached ends of the wires, and also out of the exit.

The other parts and uses of my machine are apparent to those skilled in the art to which it appertains; and I do not claim all parts of the machine described, for much of it has been in use; but What I do claim, and desire to secure by Letters Patent, is—

1. The described device for controlling the pressure-bar $h$, consisting of the spring $g'$, clamp $g''$, and clamp-screw $g'''$, projection $h'$, check-rod $n'$, check-rod clamp $n''$, and its set-screw $n''''$, in combination with the pressure-bar $h$ and posts $a'$ $a''$, the parts being constructed substantially as set forth.

2. The combination of the rag-wheel $b$, corn-returning lip $e'''$, and the tubular conveyer $e'$, the latter fitted to and covering the lower part of the toothed side of the rag-wheel $b$, and having a top or roof part, $i$, a side part, $i'$, and a floor part, $i''$, the said parts being provided with openings and bars which radiate transversely from the axis of the wheel $b$ in their position next the bar $h$, and beyond that having bars and openings arranged perpendicularly to the line on which the emerging cobs are carried, said conveyer extending into the corn-returning lip $e'''$, and being also provided with perpendicular openings and bars, substantially as set forth.

3. The cob-conveyer $e'$, provided with the sifting-extension $e''$ and with the corn-returning lip $e'''$, the said extension being made with bars and openings and operating as set forth.

4. The lip $e'''$, inclosing the extension $e''$ of the cob-conveyer, composed of the floor or base $j'$, sides $j\,j''$, and the extension $e''$, in combination with the apron $f$ and hinging-staples $f'$, said apron closing the outer margin of the exit $e$, as set forth.

5. The combination of the fan $l$ with the blast-tube shown and described, constructed of the boards $s^3\,s^4\,s^5$, and provided with an upper aperture, $w'$, and a lower aperture, $w''$, through which apertures the shelled corn passes, the lower aperture being covered by wires arranged side by side, as shown, and having their upper ends secured to the board $s^3$, and their lower ends loose and elevated above and projecting over the end $s''$ of the board $s^3$, the said parts operating to winnow the shelled corn of its chaff, silk, and other impurities as it drops through the blast-tube, as set forth.

JOHN S. WATERMAN.

Witnesses:
S. J. PARKER,
S. F. MACK.